United States Patent [19]
Soshi et al.

[11] Patent Number: 5,559,570
[45] Date of Patent: Sep. 24, 1996

[54] CAMERA HAVING AN ANTI-VIBRATION DEVICE WITH IMPROVED POSITIONING OF ANTI-VIBRATION SENSORS

[75] Inventors: Isao Soshi, Tokyo; Hidenori Miyamoto, Urayasu; Minoru Katou; Junichi Omi, both of Kawasaki; Tatsuo Amanuma, Ageo, all of Japan

[73] Assignee: Nikon Corporation, Tokyo, Japan

[21] Appl. No.: 248,013

[22] Filed: May 24, 1994

[30] Foreign Application Priority Data

May 24, 1993 [JP] Japan ................................. 5-144325
May 28, 1993 [JP] Japan ................................. 5-151026

[51] Int. Cl.$^6$ ..................... G03B 17/00; G03B 7/08; G03B 39/00
[52] U.S. Cl. ..................... 354/202; 354/430; 354/70
[58] Field of Search ..................... 354/126, 135, 354/149.11, 70, 430, 485, 202; 348/208; 359/557

[56] References Cited

U.S. PATENT DOCUMENTS

| | | | |
|---|---|---|---|
| 5,084,724 | 1/1992 | Maeno | 354/430 |
| 5,150,150 | 9/1992 | Enomoto | 354/456 |
| 5,153,633 | 10/1992 | Otani | 354/430 |
| 5,361,116 | 11/1994 | Funahashi | 354/403 |

Primary Examiner—David M. Gray
Assistant Examiner—Eddie C. Lee

[57] ABSTRACT

A camera having an anti-vibration sensor positioned so as to reduce the effect of electrically generated noise on the anti-vibration sensor. The camera includes a camera body having first, second and third portions, the second portion for coupling a photographic lens barrel to the camera body and being between the first and third portions. An anti-vibration sensor is positioned on the first portion of the camera body. An electrical noise generating source is positioned on the third portion of the camera body. In this manner, the photographic lens barrel acts as a shielding member when the photographic lens barrel is coupled to the second portion of the camera body. The present invention also describes a camera which includes a camera body, a first anti-vibration sensor which is coupled to the camera body and detects the amount of vibration of the camera in a first direction, and a second anti-vibration sensor which is coupled to the camera body and detects the amount of vibration of the camera in a second direction, the second direction being different from the first direction. The camera includes a strobe and a strobe capacitor which delivers electric charge to the strobe. Wiring electrically connects the strobe to the strobe capacitor and generates electric noise when current is passing through the wiring, the effect of the electric noise being greater in the second direction then in the first direction and the distance from the second anti-vibration sensor to the wiring being longer than the distance from the first anti-vibration sensor to the wiring.

16 Claims, 5 Drawing Sheets

CAMERA HAVING AN ANTI-VIBRATION DEVICE WITH IMPROVED POSITIONING OF ANTI-VIBRATION SENSORS

BACKGROUND OF THE INVENTION

1. Field of the Invention

The present invention relates to a camera having an anti-vibration device which utilizes anti-vibration sensors.

2. Description of the Related Art

Conventional cameras are provided with anti-vibration devices which utilize anti-vibration sensors to sense and reduce the effect of vibrations.

Conventional cameras which have anti-vibration devices do not use angular acceleration detection devices as anti-vibration sensors.

SUMMARY OF THE INVENTION

Accordingly, it is an object of the present invention to provide a camera having an anti-vibration device which uses an angular acceleration detection device as an anti-vibration sensor.

It is also an object of the present invention to provide an angular acceleration detection device as part of an anti-vibration device in a camera in order to improve performance of anti-vibration devices.

It is a further object of the present invention to reduce the effect of electrical noise on an angular acceleration detection device.

It is also an object of the present invention to position an angular acceleration detection device so that the angular acceleration detection device is not located in close proximity to mechanisms inside the camera which generate electrical noise.

It is an additional object of the present invention to reduce the effect of electrically generated noise on an angular acceleration detection device, without requiring the use of a separate shielding member to protect the angular acceleration detection device.

It is also an object of the present invention to reduce the size and cost of a camera which utilizes an angular acceleration detection device.

Additional objects and advantages of the invention will be set forth in part in the description which follows and, in part, can be learned from the description, or by practice of the invention.

The foregoing objects of the present invention are achieved by providing a camera comprising a camera body having first, second and third portions, the second portion for coupling a photographic lens barrel to the camera body and being between the first and third portions, an anti-vibration sensor positioned on the first portion of the camera body, and an electrical noise generating source positioned on the third portion of the camera body, so that the photographic lens barrel acts as a shielding member when the photographic lens barrel is coupled to the second portion of the camera body.

The foregoing objects of the present invention are also achieved by providing a camera comprising a camera body, a first anti-vibration sensor which is coupled to the camera body and detects the amount of vibration of the camera in a first direction, a second anti-vibration sensor which is coupled to the camera body and detects the amount of vibration of the camera in a second direction, the second direction being different from the first direction, a strobe, a strobe capacitor which delivers electric charge to the strobe, and wiring which electrically connects the strobe to the strobe capacitor and generates electric noise when current is passing through the wiring, the effect of the electric noise being greater in the second direction then in the first direction and the distance from the second anti-vibration sensor to the wiring being longer than the distance from the first anti-vibration sensor to the wiring.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
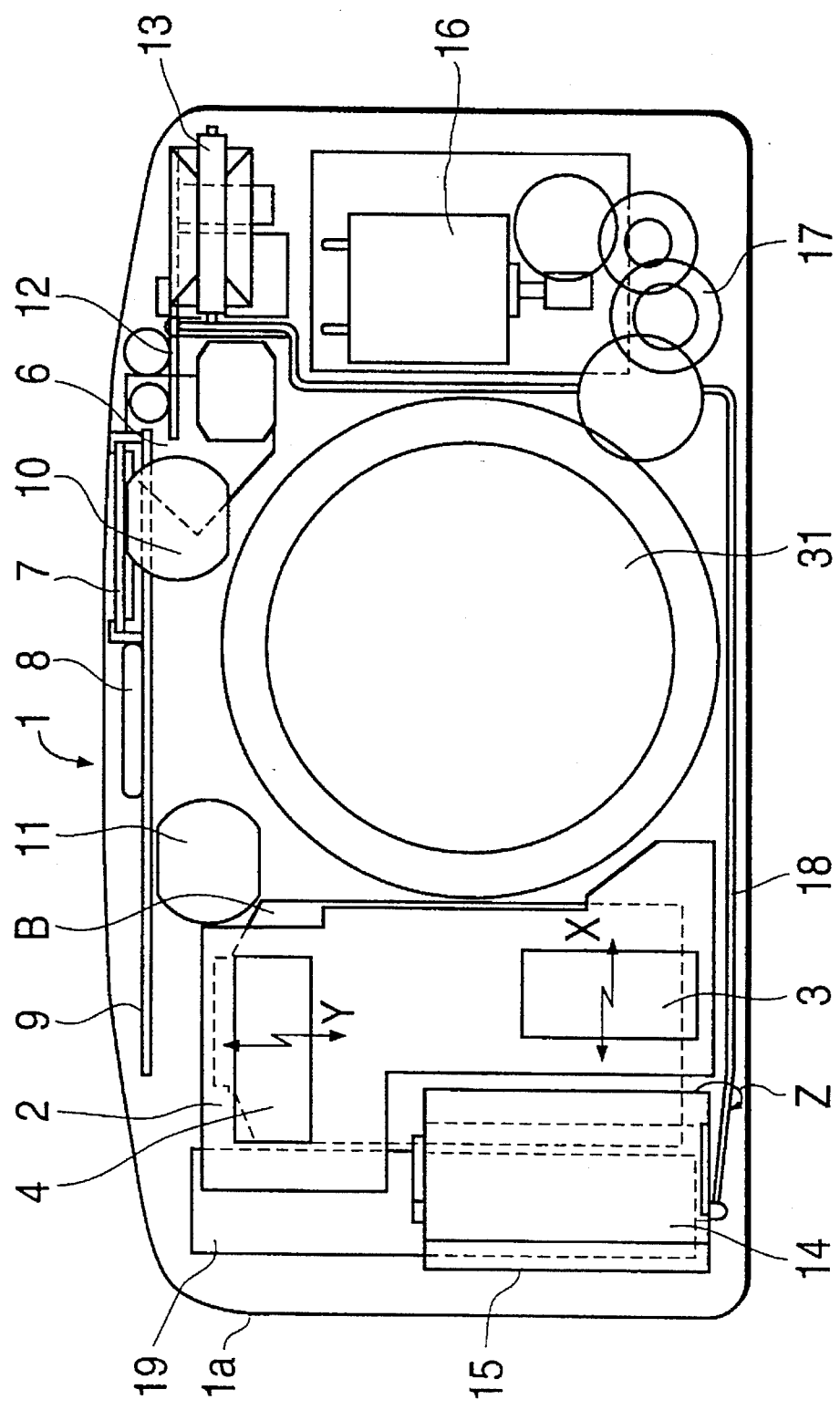
FIG. 1 is a front view of a camera having an anti-vibration photographic function according to an embodiment of the present invention.

Reference will now be made in detail to the present preferred embodiments of the present invention, examples of which are illustrated in the accompanying drawings, wherein like reference numerals refer to like elements throughout.

The inventors of the present invention recognized that angular acceleration detection devices are not used in conventional cameras having anti-vibration devices. The inventors also recognized that angular acceleration detection devices will be affected by electrical noise and that an angular acceleration detection device should not be located in close proximity to mechanisms inside the camera which generate electrical noise.

FIG. 1 is a front view of a camera having an anti-vibration photographic function according to an embodiment of the present invention.

Referring now to FIG. 1, photographic lens barrel 31 is coupled to, and centrally situated on camera body 1. To be "coupled to" camera body 1, photographic lens barrel 31 can be formed as part of camera body 1 or can be separately attachable and detachable from camera body 1. Photographic lens barrel 31 provides an anti-vibration function and can be a photographic "zoom" lens barrel. A cartridge compartment B for the insertion of a film cartridge 21 (see FIG. 2) is on the left-hand side of camera body 1, as seen from the front side (subject side) of camera body 1. As illustrated in FIGS. 1 and 3, an anti-vibration baseplate 2 and a battery 14 are located on the front side of cartridge compartment B, and a battery 15 is received at the rear side of battery 14. On the rear side of battery 15, a strobe capacitor 19 is received within a grip portion 1a of camera body 1 shaped in a form that allows a photographer to easily hold the camera.

Lead wires 18 (FIGS. 1 and 3) connect strobe capacitor 19 and a strobe circuit unit 12. Lead wires 18 are wired using the bottom space of camera body 1 and run below anti-vibration baseplate 2. A magnetic flux in the Z direction (see FIGS. 1 and 3) is generated in the peripheral space of lead wires 18 during the action of the strobe. Strobe circuit unit 12 operates in conjunction with a strobe light generator 13. Generally, a "strobe" includes strobe circuit unit 12 and strobe light generator 13 and the "strobe" is connected to strobe capacitor 19. These types of strobe components are well-known.

An anti-vibration sensor 3 is mounted on anti-vibration baseplate 12 next to battery 14 and above lead wires 18. Anti-vibration sensor 3 is an angular acceleration sensor which detects the amount of vibration in the yaw direction (X direction). Anti-vibration sensor 3 is only minimally affected by a magnetic flux in the Z direction.

An anti-vibration sensor 4 is an angular acceleration sensor that detects the amount of vibration in the pitch direction (Y direction). In order to effectively use the restricted space within the camera body 1, anti-vibration sensor 4 is mounted in a space above anti-vibration sensor 3.

In summary, the effect of electrical noise generated by lead wires 18 is smaller on anti-vibration sensor 3 than the effect on anti-vibration sensor 4. Therefore, anti-vibration sensor 3 is positioned closer to lead wires 18 than anti-vibration sensor 4 is positioned.

A main baseplate 9 includes a CPU 8 for control of the operations of the camera. An LCD device 7 is mounted to main baseplate 9 and is provided as an external display. A viewfinder 6 includes an objective lens 6a (see FIG. 2) and an ocular lens 6b (see FIG. 2). Main baseplate 9, LCD device 7 and viewfinder 6 are located at the upper side of photographic lens barrel 31.

A drive motor 16 operates in conjunction with a drive gear unit 17 to drive photographic lens barrel 31. This type of lens drive operation is well-known. An infrared light projection device 10 and an infrared light receiving device 11 act as a range measurement device required for autofocus operations. This type of range measurement device is well-.known.

Figure 2:
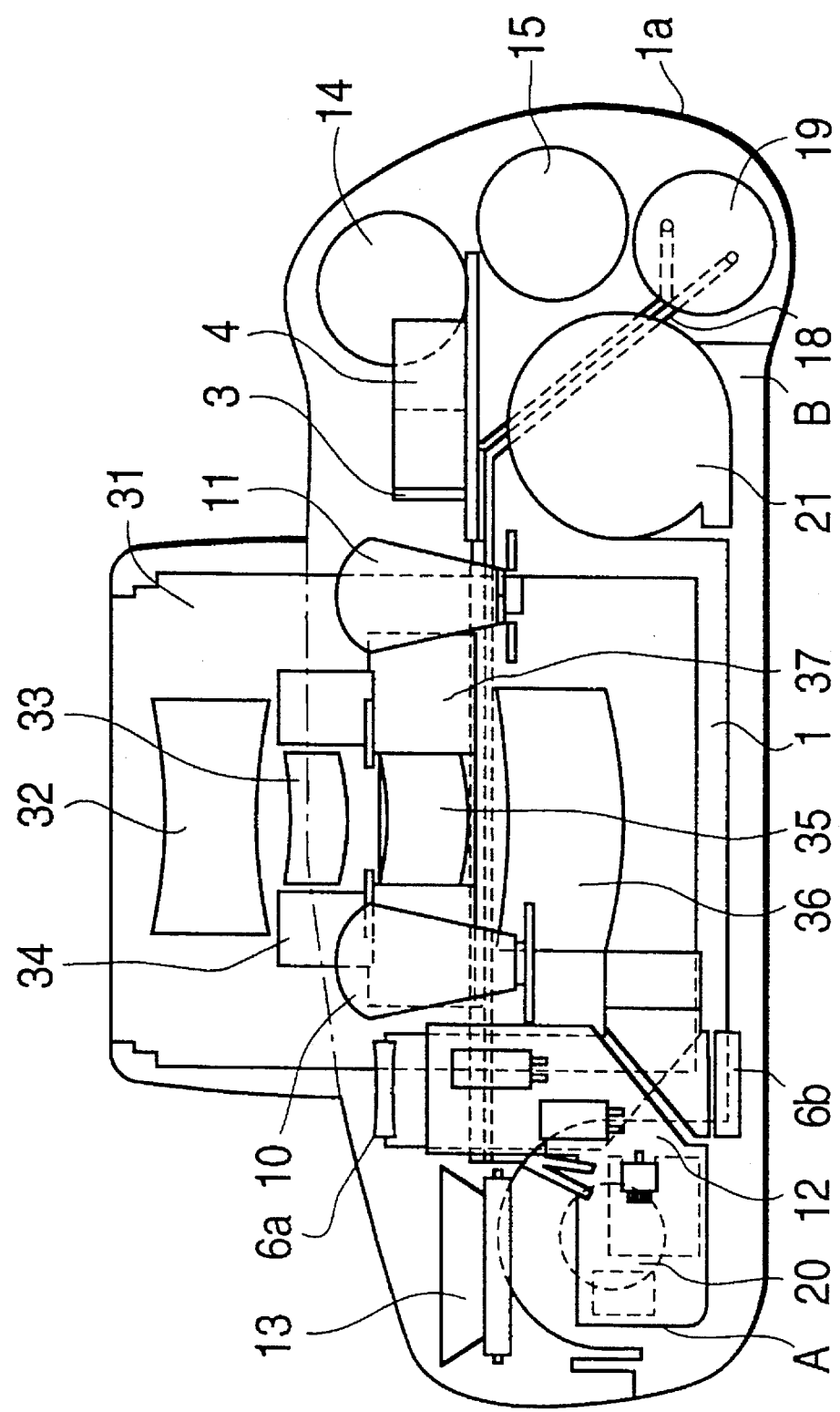
FIG. 2 is a top view of a camera having an anti-vibration photographic function, as illustrated in FIG. 1, according to an embodiment of the present invention.
Figure 3:
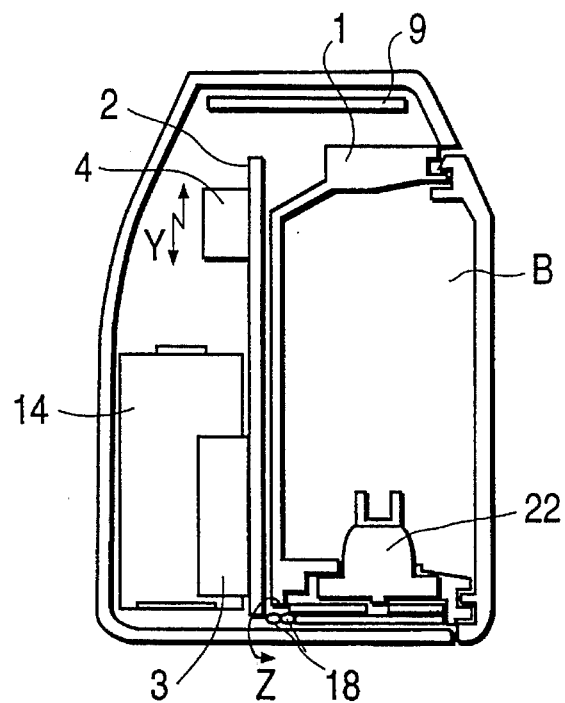
FIG. 3 is a side cross sectional view of a camera having an anti-vibration photographic function, as illustrated in FIG. 1, according to an embodiment of the present invention.

As shown in FIG. 2, photographic lens barrel 31 includes photographic lens groups 32, 33 and 36. A shutter device 34 is mounted in photographic lens group 33. An anti-vibration lens group 35 is driven by an anti-vibration lens drive device 37 based on the information from anti-vibration sensors 3 and 4.

As shown in FIG. 2, a spool compartment A is arranged on the right-hand side as seen from the front side (subject side) of camera body 1. A spool 20 is provided in spool compartment A and includes a windup motor (not illustrated). Drive motor 16 and drive gear unit 17 for driving the photographic lens barrel 31 are located at the front side (subject side) of spool compartment A. Strobe light generator 13 and strobe circuit unit 12 are located above spool compartment A.

As shown in FIG. 3, a rewinding fork 22 is used to rewind the film.

Strobe light generator 13 and strobe circuit unit 12, which generate a relatively large amount of electrical noise, are located in the front side (subject side) of the camera, on the right-hand side seen from the front. Electrical supply batteries 14 and 15 and strobe capacitor 19 are located in grip portion 1 a of camera body 1a which is on the left-hand side seen from the front side (subject side) of the camera. Anti-vibration sensor 4 is located in the space at the top of battery 14 and anti-vibration sensor 3 is located next to batteries 14 and 15.

Lead wires 18 (which generate a magnetic flux in the Z direction during strobe operation) connecting strobe capacitor 19 and strobe circuit unit 12 pass at the bottom of the camera below anti-vibration baseplate 2. Anti-vibration baseplate 2 mounts anti-vibration sensors 3 and 4. Therefore, the main electrical noise generation sources (lead wires 18, strobe capacitor 19, and strobe circuit 12) are separately located from anti-vibration sensors 3 and 4. As a result, anti-vibration sensors 3 and 4 receive a relatively small amount of electrical noise.

As shown in FIG. 1, lead wires 18 run along a length along the bottom of the camera. This length of the bottom area of the camera can be considered a "border surface" of the camera. The border surface could also be the length running along the top of the camera, parallel to the length along the bottom of the camera illustrated in FIG. 1, so that the lead wires 18 could also run along the top of the camera.

The camera size can also be reduced as a result of the above described layout of lead wires 18, strobe capacitor 19, strobe circuit unit 12 and anti-vibration sensors 3 and 4.

In order to reduce the effect of electrically generated noise on anti-vibration sensors 3 and 4 and to reduce camera size, a camera having an anti-vibration photographic function according to an embodiment of the present invention is equipped with a first anti-vibration sensor to detect the amount of vibration of the camera body in the yaw direction, a second anti-vibration sensor to detect the amount of vibration of the camera body in the pitch direction, a strobe built into the camera body, a strobe capacitor to deliver electric charge to the strobe, a battery to supply power to the strobe, and wiring means to electrically connect the strobe and the strobe capacitor.

The anti-vibration sensor which has a sensing direction that receives a relatively small effect from electrical noise generated by the wiring means is located closer to the wiring means than the other anti-vibration sensor. This positioning of the first and second anti-vibration sensors in relation to the wiring means provides a countermeasure against electrically generated noise without requiring an additional space-consuming, weight-adding, hardware mechanism, such as a separate shielding member. As a result, the camera body can be designed with a reduced size and the overall camera cost can be reduced.

Moreover, in the case in which an anti-vibration sensor is located in a position separated from the strobe (which is a source generating electrical noise), it becomes possible to even further reduce the effects of electrical noise.

Figure 6:
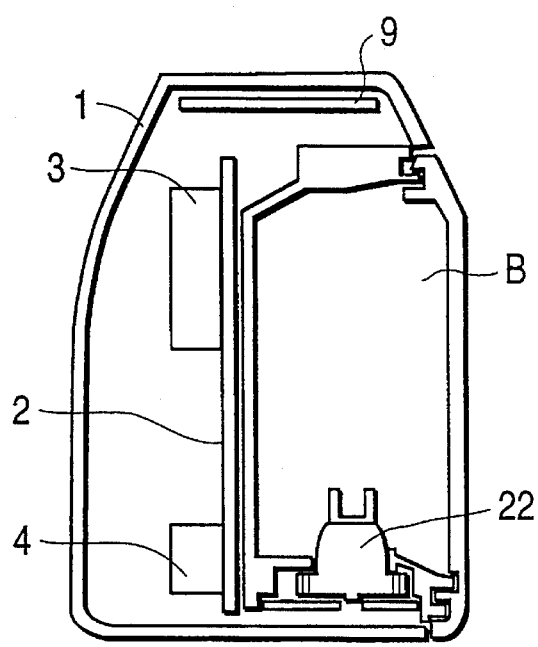
FIG. 6 is a cross sectional view of a camera having an anti-vibration photographic function, as illustrated in FIG. 4, according to an embodiment of the present invention.
Figure 4:
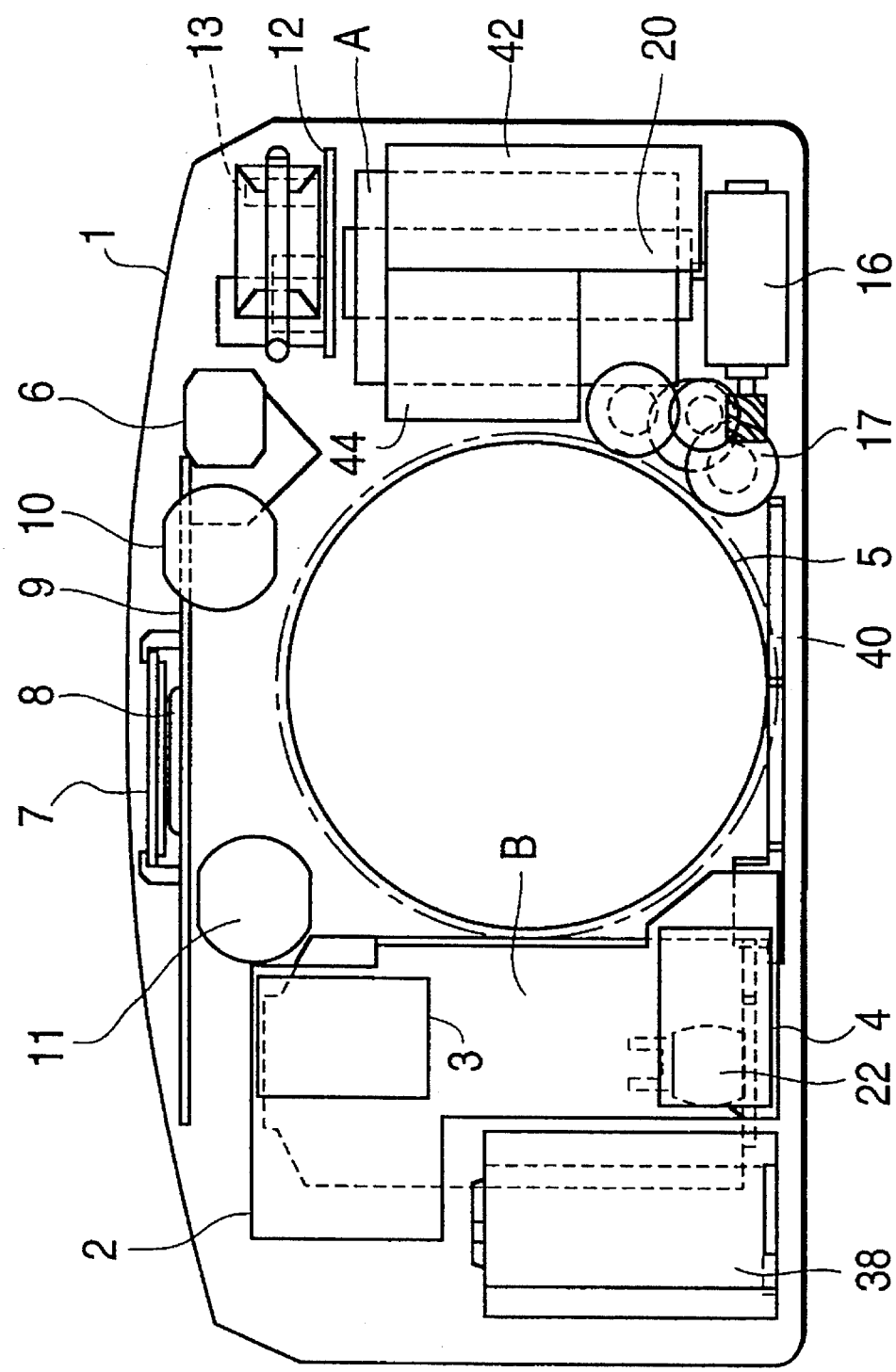
FIG. 4 is a front view of a camera having an anti-vibration photographic function according to an additional embodiment of the present invention.
Figure 5:
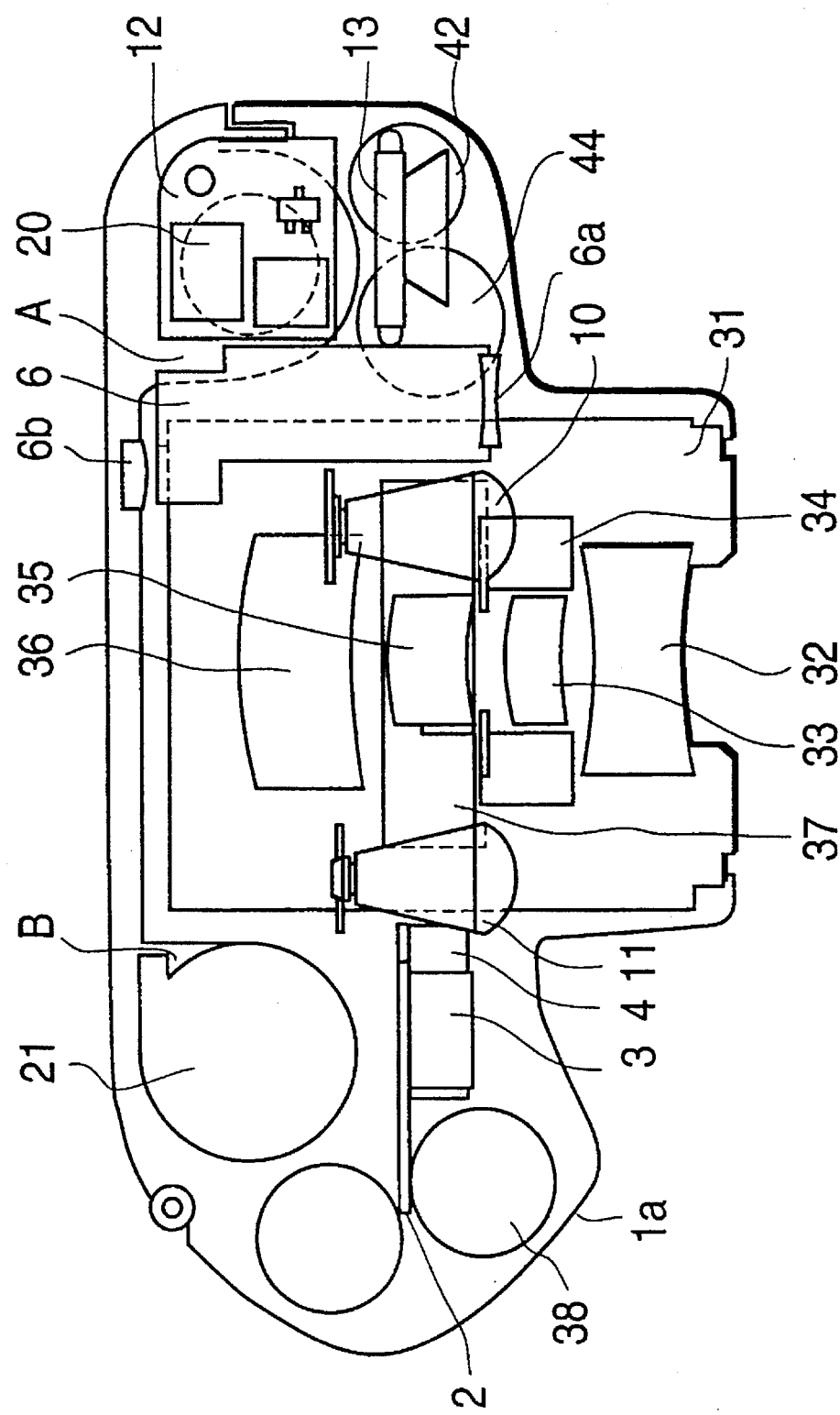
FIG. 5 is a top view of a camera having an anti-vibration photographic function, as illustrated in FIG. 4, according to an embodiment of the present invention.

FIGS. 4-6 illustrate an additional embodiment of the present invention. Reference numerals in FIGS. 4-6 which are the same as reference numerals in FIGS. 1-3 represent similar structures and a further description of the respective structures may be omitted. FIG. 4 is a front view of a camera having an anti-vibration photographic function according to an additional embodiment of the present invention. FIG. 5 is a top view of a camera having an anti-vibration photographic function-as in FIG. 4 according to an embodiment of the present invention. FIG. 6 is a cross sectional view of a camera having an anti-vibration photographic function as in FIG. 4 according to an embodiment of the present invention.

Referring to FIGS. 4–6, photographic lens barrel 31 is centrally situated on camera body 1. On the left-hand side, seen from the front side (subject side) of the camera body, cartridge compartment B is arranged for insertion of film cartridge 21 (see FIG. 5). Rewind fork 22 is used for rewinding the film and is coupled to a rewind gear train 40.

Anti-vibrations sensors 3 and 4 are mounted on anti-vibration baseplate 2. Anti-vibration sensors 3 and 4 are angular velocity detection sensors and are located on the front side of the cartridge compartment B. Battery 38 is received within grip portion 1a and separated from anti-vibration baseplate 2. Strobe capacitors 42 and 44 deliver electric charge for strobe operation.

As illustrated in FIG. 5, photographic lens barrel 31 includes photographic lens groups 32, 33, 36 and anti-vibration lens group 35. Shutter device 34 is mounted in anti-vibration lens group 35. Anti-vibration lens group 35 is driven by anti-vibration lens drive device 37 based on information provided by anti-vibration sensors 3 and 4. Infrared projection device 10 and infrared light receiving device 11 act as a range measurement device for autofocus procedures and are located above photographic lens barrel 31 (see FIG. 4).

CPU 8 controls the operations of camera body 1. A main baseplate 9 mounts LCD device 7 for use as an external display. Viewfinder 6, including objective lens 6a and ocular lens 6b, is located in camera body 1 (see FIG. 5).

As illustrated in FIG. 5, spool compartment A is arranged on the right-hand side as seen from the front side of the camera body 1 (subject side). Drive motor 16 and a drive gear unit 17 are used to drive photographic lens barrel 31. Strobe capacitors 42 and 44, drive motor 16 and drive gear unit 17 are located in a space at the front side (subject side) of spool compartment A (see FIG. 4). Strobe light generator 13 and strobe circuit unit 12 are located above spool compartment A (see FIG. 4).

Strobe light generator 13, strobe circuit unit 12, strobe capacitors 42 and 44, a windup motor (not illustrated) for the film stored on spool 20, and drive motor 16 are located in positions separated from anti-vibration sensors 3 and 4, with the photographic lens barrel 31 separating anti-vibration sensors 3 and 4 from strobe light generator 13, strobe circuit unit 12, strobe capacitors 42 and 44, windup motor and drive motor 16. In this manner, the sources of electrical noise (that is, strobe light generator 13, strobe circuit unit 12, strobe capacitors 42 and 44, windup motor and drive motor 16) are located on the opposite side of photographic lens barrel 31 from anti-vibration sensors 3 and 6. Therefore, photographic lens barrel 31 is positioned between anti-vibration sensors 3 and 4 and the sources of electrical noise. In this manner, photographic lens barrel 31 acts as a shielding member, thereby allowing a camera to have an anti-vibration photographic function and be of a reduced size and lower cost.

In the present invention, an anti-vibration sensor is located on the opposite side of a photographic lens from an electrical noise generation source having the potential to affect the anti-vibration sensor. A photographic lens barrel is positioned between the anti-vibration sensor and the electrical noise generation source. In this manner, the photographic lens barrel acts as a shielding member.

In the present invention, camera body 1 is, in effect, divided into first, second and third portions with the second portion being between the first and third portions. Photographic lens barrel 31 is coupled to the second portion. Generally, anti-vibration sensors 3 and 4 are both positioned on either the first portion or the third portion of camera body 1 and sources of electrical noise are positioned on the other of the first and third portions of camera body 1. Therefore, photographic lens barrel 31, positioned on the second portion, acts as a shield between the first and third portions.

As previously described, photographic lens barrel 31 is coupled to, and centrally situated on camera body 1. To be "coupled to" camera body 1, photographic lens barrel 31 can be formed as part of camera body 1 or can be separately attachable and detachable from camera body 1. Therefore, in the present embodiment, photographic lens barrel 31 is coupled to-the second portion of camera body 1.

This positioning of the anti-vibration sensor and the electrical noise generation source in relation to the photographic lens barrel provides a countermeasure against electrically generated noise without requiring an additional space-consuming, weight-adding, hardware mechanism, such as a separate shielding member. As a result, the camera body can be designed with a reduced size and the overall camera cost can be reduced.

Although a few preferred embodiments of the present invention have been shown and described, it would be appreciated by those skilled in the art that changes may be made in these embodiment without departing from the principles and spirit of the invention, the scope of which is defined in the claims and their equivalents.

What is claimed is:

1. A camera comprising:
    a camera body having first, second and third portions, the second portion for coupling a photographic lens barrel to the camera body and being between the first and third portions;
    an anti-vibration sensor positioned on the first portion of the camera body; and
    an electrical noise generating source positioned on the third portion of the camera body, so that the photographic lens barrel acts as a shielding member when the photographic lens barrel is coupled to the second portion of the camera body.

2. A camera as in claim 1, wherein the electrical noise generating source includes at least one of a strobe generation unit, a strobe circuit unit, a strobe capacitor, a film windup motor and a lens barrel drive motor.

3. A camera as in claim 1, wherein the anti-vibration sensor is an angular acceleration sensor.

4. A camera as in claim 3, wherein the photographic lens barrel includes an anti-vibration device which compensates for the effects of vibration.

5. A camera as in claim 2, wherein the anti-vibration sensor is an angular acceleration sensor.

6. A camera as in claim 5, wherein the photographic lens barrel includes an anti-vibration device which compensates for the effects of vibration.

7. A camera comprising:
    a camera body;
    a first anti-vibration sensor which is coupled to the camera body and detects the amount of vibration of the camera in a first direction;
    a second anti-vibration sensor which is coupled to the camera body and detects the amount of vibration of the camera in a second direction, the second direction being different from the first direction;
    a strobe;
    a strobe capacitor which delivers electric charge to the strobe; and
    wiring which electrically connects the strobe to the strobe capacitor and generates electric noise when current is passing through the wiring, the effect of the electric noise being greater in the second direction then in the first direction and the distance from the second anti-vibration sensor to the wiring being longer than the distance from the first anti-vibration sensor to the wiring.

8. A camera as in claim 7, wherein the wiring extends substantially in the first direction.

9. A camera as in claim 8, wherein the first direction is the yaw direction of the camera.

10. A camera as in claim 8, wherein the second direction is the pitch direction of the camera.

11. A camera as in claim 9, wherein the second direction is the pitch direction of the camera.

12. A camera as in claim 7, wherein the first and second anti-vibration sensors are angular acceleration detection sensors and the strobe comprises a strobe light generation unit and a strobe circuit unit.

13. A camera as in claim 8, wherein the first and second anti-vibration sensors are angular acceleration detection sensors and the strobe comprises a strobe light generation unit and a strobe circuit unit.

14. A camera as in claim 7, further comprising a battery and a camera body having first, second and third portions and a border surface, the second portion for coupling a photographic lens barrel to the camera body and being between the first and third portions, the battery and the strobe capacitor being positioned on the first portion of the camera body and the strobe being positioned on the third portion of the camera body, and the wiring runs along the border surface.

15. A camera as in claim 9, further comprising a battery and a camera body having first, second and third portions and a border surface, the second portion for coupling a photographic lens barrel to the camera body and being between the first and third portions, the battery and the strobe capacitor being positioned on the first portion of the camera body and the strobe being positioned on the third portion of the camera body, and the wiring runs along the border surface.

16. A camera as in claim 12, further comprising a battery and a camera body having first, second and third portions and a border surface, the second portion for coupling a photographic lens barrel to the camera body and being between the first and third portions, the battery and the strobe capacitor being positioned on the first portion of the camera body and the strobe being positioned on the third portion of the camera body, and the wiring runs along the border surface.

* * * * *